United States Patent [19]

Arrhenius

[11] 4,391,267
[45] Jul. 5, 1983

[54] HEAT STORAGE MATERIAL
[75] Inventor: Gustaf O. Arrhenius, La Jolla, Calif.
[73] Assignee: Kay Laboratories, Inc., San Diego, Calif.
[21] Appl. No.: 254,547
[22] Filed: Apr. 15, 1981
[51] Int. Cl.³ .................. F24H 7/00; C09K 3/18; F28D 17/00
[52] U.S. Cl. .................. 126/400; 252/70; 165/10
[58] Field of Search ............. 126/400, 436, 430, 206, 126/204, 263, 207, 246, 375; 252/70; 165/104.12, 10 A, 10

[56] References Cited
U.S. PATENT DOCUMENTS
3,951,127  4/1976  Watson ..................... 126/204

OTHER PUBLICATIONS
M. Telkes, Solar Energy Storage, Sep. 1974, Ashrae Journal, pp. 38–44.

Primary Examiner—James C. Yeung
Assistant Examiner—J. Anderson
Attorney, Agent, or Firm—Ellsworth R. Roston; Charles H. Schwartz

[57] ABSTRACT

A liquid melt becomes converted to crystalline form at a particular temperature either spontaneously or when artificially nucleated. The liquid releases heat at crystallization. An additive is dissolved in the liquid melt. The additive has properties of forming a metastable solid solution together with the warm crystalline compound formed from the melt. When the additive exsolves, the crystalline aggregate is weakened and is easily decomposed into fragments of small size. The additive materials may include disodium hydrogen phosphate, dipotassium hydrogen phosphate, or their ammonium or sodium analogs. The additive may be dissolved in small amounts in the liquid to be crystallized, amounts to two percent (2%) to four percent (4%) being typical. The amount of the relative metastability of the additive in the solid solution contributes to control the size and intergrowth of the crystals which are ultimately produced when the cooling or supercooled fluid crystallizes. The relative amounts of disodium hydrogen phosphate (DSHP) and trisodium phosphate (TSP), or their potassium or ammonium analogs, in the melt controls the pH of the melt. When the liquid constitutes molten sodium thiosulpate pentahydrate (STP), the additive in the mixture is preferably in the form of its highest hydrates to insure that a sufficient amount of water is present in the melt to prevent the liquid melt of STP from crystallizing in an undesirable lower hydrate form.

15 Claims, 6 Drawing Figures

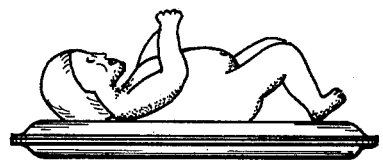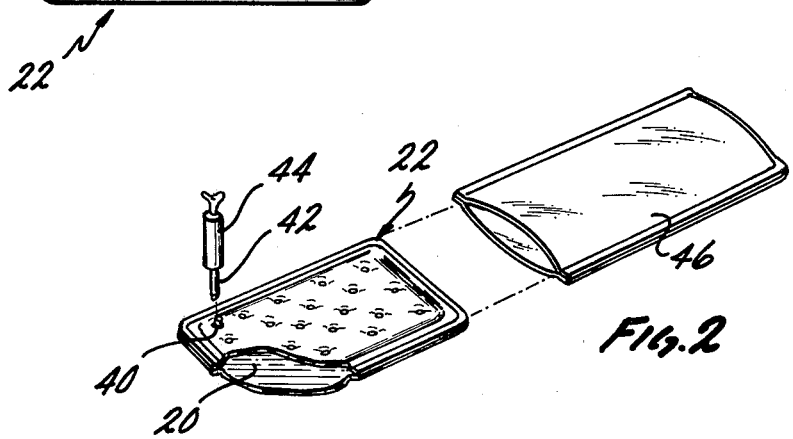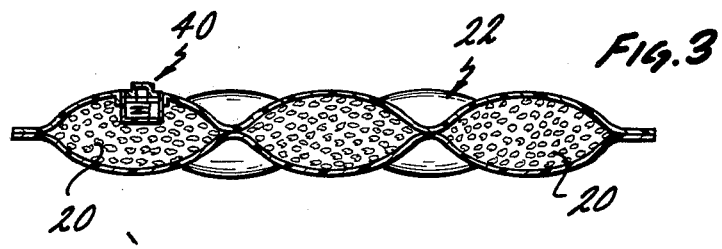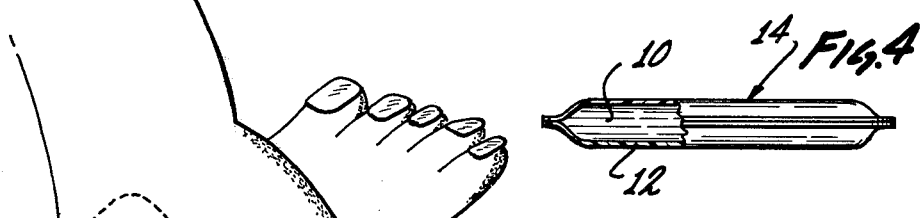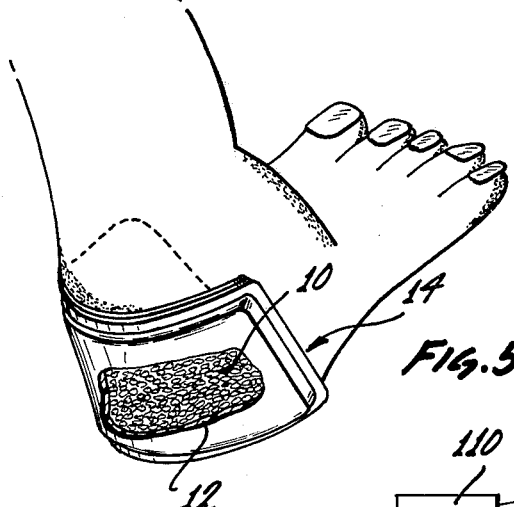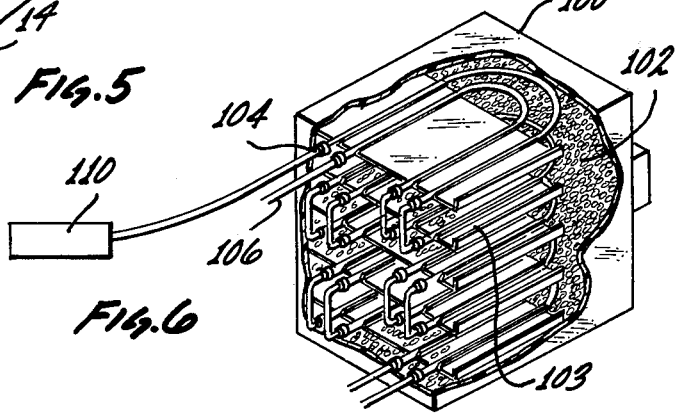

HEAT STORAGE MATERIAL

This invention relates to recyclable containers for generating heat at a controlled temperature for extended periods of time. More particularly, the invention relates to containers in which a liquid melt in the containers becomes crystallized in a form for an efficient transfer of heat to a patient's body. The invention also relates to a method of forming such containers.

As medical science becomes advanced, it is increasingly important to apply heat at controlled temperatures to a patient for extended periods of time in order to optimize the beneficial effects of such heat on the patient. For example, it is often difficult to obtain blood from a baby for performing tests on the baby. It has been found that the blood can be withdrawn most easily from the heel of the baby, particularly when the heel has been heated to a particular temperature. Since the baby cannot express in any easily identifiable way when the heat becomes excessive, babies may become burned by the application of excessive heat.

As another example, it is often desirable to dispose a baby on a mattress which has been heated to a particular temperature. The mattress has to be comfortable to the baby at the same time that heat is being applied at the particular temperature to the baby. For example, the mattress should not be lumpy or provide sharp projections since the lumps or sharp projections affect the comfort of the baby. Crystal lumps also adversely affect the rate and uniformity of heat transfer.

As a further example, solar heat is becoming increasingly important as other sources of energy become scarce and expensive. It is desirable to be able to store such solar heat in an efficient manner without excessive energy loss as a result of, and during, such energy storage and to release such heat in an efficient manner at the time that it is desired to use such heat.

Preferably the containers should be recyclable. In other words, the containers should be capable of being used more than once to generate heat at the particular temperature. In this way, the cost of the containers can be amortized over a number of uses so that the cost per use is relatively low. This is particularly true when the containers are used to store solar heat.

Containers have been provided in the prior art which meet a number of the objectives discussed above. For example, containers have been provided which are able to operate on a recyclable basis. Such containers have used supercooled melts which are nucleated at a particular temperature to become crystallized and to generate heat as the melts crystallize. Such containers employing supercooled liquid melts have been recyclable since the crystalline solid can be heated at the particular temperature to change the crystals to liquid state and the liquid melt can then be retained in a metastable form at temperatures below the particular melting temperature.

It has also been difficult to provide the crystals with a size within relatively narrow limits. It has further been difficult to provide the crystals with a size which is predetermined in accordance with the use to be made of the crystals. For example, crystals of one size may be desired for heel pads for babies and crystals of a different size may be desired for baby mattresses or for a container storing solar energy.

It has also been difficult to maintain the pH of the mixture in the containers with a particular value. It is important to maintain the pH of the mixture at a value which causes the material to be basic and not acidic. Otherwise, the liquid melt of a substance such as STP may decompose chemically and form a colloidal suspension of sulfur and other decomposition products. These products are capable of nucleating the STP at undesirable times, thereby causing the supercooled melt to be unstable. Such decomposition also deteriorates the property of the phase change material as a heat storage medium. Acidic decomposition products of STP, moreover, make it corrosive against metals and other materials normally not adversely affected by STP. If the pH of the melt is too high or low, corrosion again becomes a problem with many plastics, metals and other materials.

This invention provides phase change systems which overcome the above difficulties. The crystallization, where the additives are used, takes place in such a way that crystals in the desired range are produced. In this way, the size of the crystallites fall in the range needed for the particular use that is made of the containers. As the supercooled melt crystallizes, it liberates heat so that the temperature rises from the particular temperature to a maximum temperature, which may coincide with, but does not exceed, the melting temperature. The containers are recyclable since they include liquids which become crystallized in the particular temperature range to generate heat and which become reconverted to liquid form by the subsequent application of heat at or above the melting temperature. The melt in the containers has characteristics of remaining as a liquid in a metastable form at temperatures at or below the particular melting temperature until such time as the generation of heat is again desired.

Preferably the liquids in the containers of this invention have capabilities of being supercooled. Different liquid phases may be used depending upon the particular temperature interval in which the heat is to be generated. In some applications of the invention, the phase change material is supercooled below the melting temperature and stored in the liquid state at such temperatures. In other applications, the phase change material is not supercooled but is maintained at the crystallizing liquidus temperature.

The phase change systems of this invention also include an additive material. The additive material may be preferably selected from a group consisting of hydrates of disodium hydrogen phosphate or trisodium phosphate or a mixture of both. Dipotassium hydrogen phosphate and tripotassium phosphate may also be used in place of their sodium equivalents. The additive material has properties of dissolving stably in the melt and metastably in the crystals and to exsolve so as to limit the ultimate size of the crystallites. The amount and chemical properties of the additive material dissolved in the stable or supercooled melt contribute to control the size of the crystallites that are produced when the melt, supecooled or a liquidus temperature, is nucleated to form one or several crystalline phases. Preferably, the amount of the additive material dissolved in the melt for controlling the size and texture of the crystallites produced from the melt should not exceed approximately two percent (2%) to four percent (4%) by weight.

The effect of the additive material in limiting the size of the crystals results from two different but related actions of the additive material. In one action, the dissolved additive material absorbs to specific surfaces of the crystals so as to inhibit their growth. In another action, the absorbed material forms a metastable solid solution in the crystals. This metastable solution subsequently exsolves to form a dispersion, coalescing into oriented vesicular interconnected liquid inclusions, which weaken the crystals and cause the crystals to break. The liquid inclusions tend to grow together on preferred crystal planes and increase in size by coalescence and thereby contribute to breaking up the crystals into fragments. These fragments assume sizes in the overall range of the order of ten (10) to one thousand (1,000) micrometers (m) with consistency corresponding to that of sand or silt. If the container is gently agitated as the crystals form, the achievement of this ultimate consistency is accelerated. In the case of the phase change medium cooling at the liquidus temperature, more vigorous stirring or agitation may be necessary to break up the crystal aggregates.

The additive material also provides other advantages of importance. Specifically, by controlling the relative proportions of the disodium hydrogen phosphate and trisodium phosphate, or their potassium or ammonium analogs, in the disolved additive material, the pH of the melt inducing the liquid additive material is also determined. This results from the fact that trisodium phosphate is more basic than disodium hydrogen phosphate. The disodium hydrogen phosphate and trisodium phosphate or their potassium or ammonium analogs are preferably added in the decahydrate form. By providing the phosphates with such additional molecules of water, assurance is provided that the major phase change compound in the melt, e.g., sodium thiosulfate, will be crystallizing as the fully hydrated form, in the case of sodium thiosulphase as the a-pentahydrate phase rather than as the dihydrate phase. This is desirable because considerably more heat is generated when the sodium thiosulphate is crystallized to the a-pentahydrate phase rather than to the dihydrate phase; similar considerations apply to other hydrates used as phase change heat storage materials. Furthermore, when the crystallized phase change medium is subsequently remelted, the lower hydrates, when they have been separated from the rest of the system by gravitational settling, require higher, and often practically unattainable, temperatures to achieve melting and destruction of deleterious moleddular clusters in the melt. Such minute crystal nuclei in the melt prevent the desired supercooling of the liquid melt and cause it to be unstable against crystallization since the minute superheated microcrystals tend to nucleate the liquid melt at undesirable and uncontrolled times. Moreover, in such cases where spontaneous nucleation is desired, the presence in the melt of superheated metastable nuclei of lower hydrates (such as dihydrates) will cause these lower hydrates to grow instead of the desirable fully hydrated phases with optimal heat of crystallization.

The phase combination of this invention also has another advantage of some importance. The addition of the disodium hydrogen phosphate or the trisodium phosphate, or their ammonium or sodium analogs, to the melt does not significantly affect the temperature of the melt during the time that the melt is crystallizing (the solidus temperature) or the heat of fusion of the phase change material. This is desirable because it insures that the optimum amount of heat still will be released from the crystallizing system, and the quality of the heat is not degraded by release of the heat at a lower temperature.

In the drawings:

FIG. 1 is a side elevational view of the present invention when used in a baby mattress;

FIG. 2 shows an exploded perspective relationship, partially broken away, of the different members included in the baby mattress of FIG. 1;

FIG. 3 is a sectional view of the baby mattress of FIGS. 1 and 2 and illustrates the relative size of the crystals produced in such a mattress when the liquid melt in the mattress crystallizes to generate heat;

FIG. 4 is a side elevational view, partially broken away, of a heel pad applied to a baby to facilitate the withdrawal of blood from the baby; and FIG. 5 is a perspective view, partially broken away, of the heel pad of FIG. 4 when applied to the heel of a baby;

FIG. 6 is a perspective view of a container for receiving and storing solar heat and for releasing such heat at controlled times.

In one embodiment of the invention, a container includes a liquid melt preferably having supercooling properties. A supercooled liquid melt has properties of crystallizing at a particular temperature to liberate heat. The crystallization occurs over an extended period of time, starting at the particular temperature and culminating at a temperature at or below the melting interval of the particular phase system so that the particular range of temperatures is produced for the extended period of time. When heat is subsequently applied to the resulting solid at or above its melting temperature interval, the solid returns to a liquid form and (unless nucleated) remains in the liquid form even at temperatures below the melting temperature interval. When the supercooled melt again becomes nucleated, it crystallizes again, while liberating the heat of fusion. In this way, the melt is able to store heat until such time as it is desired to liberate the heat. Furthermore, the system can be recycled through a number of successive cycles to store and then liberate heat.

A number of different materials can be used to store and liberate heat of crystallization (=heat of fusion). These materials are hereinafter referred to as "the melt." These materials include sodium sulfate decahydrate and sodium thiosulfate pentahydrate (hypo, STP).

An additive material is dissolved in the stable or supercooled melt. The additive material is preferably disodium hydrogen phosphate dodecahydrate or trisodium phosphate decahydrate or a mixture of both. Both of these compounds, due to their molecular structure, have enhanced solubility in the salt hydrate melts considered here. Dipotassium or diammonium hydrogen phosphate and tripotassium or triammonium phosphate may be respectively used in place of disodium hydrogen phosphate and trisodium phosphate.

When disodium hydrogen phosphate or trisodium phosphate or their potassium or ammonium analogs, or a mixture of such materials, are used as the dissolved additive material, the additive material provides an optimal effect at a concentration by weight of approximately two percent (2%) to four percent (4%) of the supercooled melt. In this concentration range, and below it, a major fraction of the dissolved additive material becomes occluded in the crystals and contributes to the textural control. Below a concentration in the melt of approximately two percent (2%), the textural effect of the exsolution of dissolved additive material in the crystals tends to decrease rapidly. As a result, as the concentration of such dissolved additive material decreases below approximately two percent (2%), the size of the crystallites produced by exsolution of the dissolved additive material and the force needed to separate the crystallites increase. Above a concentration of approximately two percent (2%) to four percent (4%) by weight or volume in the supercooled melt, the liquid additive material has only a minor added effect on the exsolution process compared to that provided at a concentration in the range of two percent (2%) to four percent (4%). Furthermore, the temperature at which the heat is decreased because the dissolved additive material present in concentrations higher than 4% disodium hydrogen phosphate in STP begins to lower the solidus curve in the system. In view of this, except for special purposes, it is desirable to include only as much of the dissolved additive material in the melt as is consistent with a periodic composition of the phase change compound together with the additive compound.

As will be appreciated, the supercooled melt tends to crystallize into a single solid mass or a few large crystal aggregates in the container if the additive material is not included. The dissolved additive material tends to inhibit the formation of such a large mass or such large masses. This results from adsorption of the additive on specific surfaces of the crystals as they are being formed. This adsorbed layer inhibits the growth of these faces of the crystals. As a result, the crystals formed to grow by the supersaturation in the supercooled melt tend to overgrow the liquid additive, thereby causing liquid inclusions to form in the crystals. These liquid inclusions coalesce to form laminar vesicles, intersecting segments of the crystals. The formation of the exsolution vesicles causes the crystals to crack and, at slight agitation, to fall apart into smaller crystallites.

The mechanical effect of exsolution on the texture of the crystals formed at nucleation of the supercooled melt is enhanced by gently agitating the supercooled melt containing the dissolved additive material. This has the effect of accelerating the formation of cracks, releasing the stress in the cyrstalline material introduced by the exsolution of the additive. Thus, by gently agitating the container as the melt solidifies, the crystalline solid tends to obtain the texture of sand or silt.

The additive material contributes other important advantages when included in the melt. For example, it is desirable to maintain the solution of the additive material in the melt so that the reaction of the melt is slightly basic rather than acidic, (approximate pH range 8–9). As will be appreciated, trisodium phosphate is more basic than disodium hydrogen phosphate. As a result, the relative amounts of disodium hydrogen phosphate and trisodium phosphate, or their potassium or ammonium analogs, control the basic properties which the additive material imparts to the melt. It is desirable to maintain the melt chemically basic in order to prevent slow decomposition of the phase change compound, yielding deleterious components and decreasing the heat storage capacity of the melt. In the case of sodium thiosulphate pentahydrate melt, sulfur is one such decomposition product. When the sulfur exists separately in the melt, it is in the form of a colloidal suspension. Such particles of sulfur in the colloidal suspension tend to serve as centers for nucleation of the melt at undesirable and unexpected times and accordingly cause the supersooled melt to be unstable. Other deleterious effects are the gradual decomposition of the melt, decreasing the heat storage capacity and yielding corrosive acidic components. In the case of large scale heat storage, these deleterious effects are even more important and arise if the melt is not adequately buffered at a pH considerably above the neutral point. However, it is not desirable for the melt to be too chemically basic because it again becomes corrosive to metals and degrades many plastics; an excessively basic melt also is irritating or corrosive to skin and other tissue.

The additive materials of this invention also provide other important advantages. For example, the additive materials do not significantly affect the temperature which would be produced in the melt alone during the time that the melt is crystallizing. The constant and reproducible temperature of the solution of the additive material in the crystallizing melt is desirable in most applications for storage of energy. The reason is that heat then can then be withdrawn in a constant predetermined temperature interval, chosen to fit the specific application, and that this temperature interval is being maintained during the entire period of discharge of the stored heat of crystallization. In this way, it is ensured in medical applications that the temperature never will exceed a physiological tolerance limit and that the physiological action remains the same during the application. In solar and heat storage applications, it is also desirable that the heat withdrawn at use, e.g. in the form of hot water or air for space heating, be delivered at or above a specific temperature interval. This temperature interval is determined by such considerations as transfer efficiency, comfort and safety factors, charging temperature and other circumstances.

The combinations disclosed above have certain important advantages. They provide a crystallization of the material such as the supercooled melt as an aggregate forming small, lubricated particles which provide an efficient transfer of heat to a patient or other animate or inaminate object receiving the heat. This results in part from the fact that the container holding the crystals is pliant because of the small size and mobility of the crystallites and can accordingly be bent to any desired shape corresponding to the shape of the object to receive the heat. For example, when the mixture 10 is disposed in a container 12 to form a heel pad generally indicated at 14 (FIGS. 4 and 5), the heel pad can be bent into a shape corresponding to the heel of a baby so that the heat released during the crystallization of the material can be applied uniformly over the entire heel area of the baby.

The mixture also has certain other advantages of some importance. For example, the mixture 20 can be disposed in a baby mattress generally indicated at 22 in FIGS. 1, 2 and 3 to warm a baby at a substantially constant temperature for an extended period of time as the baby lies on the mattress. By providing for the crystallization of the supercooled melt systems into an aggregate, forming particles of a small size, the mattress 22 is able to adapt to the contour of the baby so that the baby continues to remain comfortable as heat is liberated from the mattress.

The size, shape and aggregation of the crystallites can be controlled by adjusting the concentration and composition of the additive material in the system. For example, if the liquid additive material forms a relatively concentrated solution in the melt, the crystallites produced are quite small in size. If the liquid additive material is low in concentration, the size of the crystals becomes correspondingly increased. The size of the crystals may be controlled to vary from microscopic size through the size of sand particles to the size of large aggregates. Furthermore, the agitation of the supercooled melt with dissolved additives after nucleation facilitates the disruption of the growing crystalline aggregate, leading to the formation of a large number of small seed crystals.

FIG. 6 schematically illustrates a system for storing solar energy for indefinite periods without any significant heat losses and for releasing such stored energy at controlled periods of time. Such a system is disclosed in patent application Ser. No. 256,595 filed by James Hitchin on Apr. 22, 1981, and assigned of record to Thermal Energy Storage, Inc., which has a cross-licensing arrangement with the assignee of record of this application. In this system, a container 100 is filled with the phase-change material 102 of this invention and is provided with coils 104 and 106 which are disposed in spaced and nested relationship. The coils 100 and 102 may be bridged by members 108. The coils 104 are connected to circulate a fluid which receives heat concentrated from the sun on solar panels 110. This heat is used to convert the phase-change material 102 to a liquid state, thereby causing the material 102 to store the solar heat without any appreciable heat loss. When it is desired to use such heat, the phase-change material 102 is nucleated and the heat liberated by the crystallization of the material 102 is transferred to fluid in the coils 104.

The systems described above can be recycled through a multiple number of uses. For example, the baby mattress 22 described above can be provided with a valve 40. After the supercooled melt in the mixture 20 in the mattress has been produced by heating the mixture above the liquidus temperature of the systems and cooling the melt to ambient temperature, a nozzle 42 may be inserted into the mattress to nucleate crystalliation of the supercooled melt. The nozzle 42 may form a part of a syringe 44 which contains a crystal-line power of the heat storage medium, e.g. sodium thiosulfate pentahydrate. This material has properties of initiating crystallization of the melt into the same form as the nucleating crystals as disclosed and claimed in U.S. Pat. No. 3,951,127 issued to Susan Watson and William Keith Watson and assigned of record to the assignee of record of this application.

The baby mattress 22 is preferably disposed in a cover 46, which offers certain advantages when used with the mattress. The cover 46 may include an outer layer formed from a suitable material such as vinyl and an inner layer formed from a suitable material such as polyurethane so that the system is pliant. In this way, the sterility of the mattress 22 can be maintained at the same time as the baby lying on the mattress remains comfortable.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination,
   a melt formed from at least one of sodium thiosulfate pentahydrate and sodium sulfate decahydrate and having properties of crystallizing into a monolithic mass when nucleated, and
   an additive material having properties of dissolving stably in the melt and metastably in the growing crystals and exsolving to separate the resulting crystallites and limit their size and having properties of providing the solution of the additive material in the melt with chemically basic properties, the additive material consisting of at least one of disodium hydrogen phosphate, trisodium phosphate and their potassium and ammonium analogs.

2. The combination set forth in claim 1 wherein the additive material has a concentration of approximately two percent (2%) to four percent (4%) by weight of the melt.

3. The combination set forth in claim 1 wherein the additive material has a concentration of approximately two percent (2%) to four percent (4%) of the melt by weight and has properties of maintaining the temperature of the mixture, during the crystallization of the melt, at substantially the temperature produced by only the melt during crystallization.

4. The combination set forth in claim 1 wherein the additive material has properties of maintaining the temperature of the mixture, during the crystallization of the melt, at substantially the temperature produced by only the melt during crystallization.

5. The combination set forth in claim 1 wherein the melt constitutes sodium thiosulfate pentahyrate.

6. The combination set forth in claim 5 wherein the additive material constitutes disodium hydrogen phosphate and trisodium phosphate.

7. The combination set forth in claim 5 wherein the additive material consitutes disodium hydrogen phosphate.

8. In combination,
   a melt formed from at least one of sodium thiosulfate pentahydrate and sodium sulfate decahydrate and having properties of melting at a particular temperature interval and of remaining in the molten state at temperatures below the particular temperature interval and of being nucleated at a temperature below this interval and of crystallization as a monolithic aggregate at the particular temperature interval and of generating heat when crystallizing, and
   an additive material having properties of being occluded in the crystals to subsequently exsolve and disrupt the crystals and prevent the crystals from growing beyond a particular size, dependent upon the concentration of the liquid additive material in the mixture, and having properties of maintaining the pH of the mixture alkaline,
   the additive material consisting of at least one of disodium hydrogen phosphate, dipotassium hydrogen phosphate, trisodium phosphate and tripotassium phosphate.

9. The combination set forth in claim 8 wherein the relative amount of the additive material by weight is approximately two percent (2%) to four percent (4%).

10. The combination set forth in claim 9 wherein the relative amounts of the disodium hydrogen phosphate, dipotassium hydrogen phosphate, trisodium phosphate and tripotassium phosphate in the additive material are selected to control the alkaline pH of the mixture.

11. The combination set forth in claim 8 wherein the solution of the additive material in the melt generates substantially the same temperature during crystallization of the melt as the melt alone generates during crystallization.

12. The combination set forth in claim 11 wherein the additive material has a concentration and structural characteristics to control the size and texture of the crystallites formed when the occluded solution of the additive material is exsolved in the crystals.

13. The combination set forth in claim 8 wherein the additive material constitutes disodium hydrogen phosphate and trisodium phosphate.

14. The combination set forth in claim 13 wherein the melt constitutes sodium thiosulfate pentahydrate.

15. The combination set forth in claim 9 wherein the melt constitutes sodium thiosulfate pentahydrate and the additive material constitutes disodium hydrogen phosphate.

* * * * *